United States Patent
AI et al.

(10) Patent No.: US 11,632,245 B2
(45) Date of Patent: Apr. 18, 2023

(54) SECURITY KEY GENERATION TECHNIQUES

(71) Applicant: ZTE Corporation, Guangdong (CN)

(72) Inventors: Jianxun AI, Guangdong (CN); He Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/159,656

(22) Filed: Jan. 27, 2021

(65) Prior Publication Data

US 2021/0152350 A1 May 20, 2021

Related U.S. Application Data

(63) Continuation of application No. PCT/CN2018/099588, filed on Aug. 9, 2018.

(51) Int. Cl.
*H04W 12/041* (2021.01)
*H04L 9/08* (2006.01)
*H04W 76/19* (2018.01)
*H04W 76/27* (2018.01)
*H04W 12/033* (2021.01)
*H04L 9/14* (2006.01)
*H04W 76/15* (2018.01)

(52) U.S. Cl.
CPC ............. *H04L 9/0866* (2013.01); *H04L 9/14* (2013.01); *H04W 12/033* (2021.01); *H04W 12/041* (2021.01); *H04W 76/19* (2018.02); *H04W 76/27* (2018.02); *H04W 76/15* (2018.02)

(58) Field of Classification Search
CPC . H04W 12/033; H04W 12/04; H04W 12/041; H04W 12/043; H04W 76/19; H04W 76/27; H04W 76/15; H04L 9/08; H04L 9/14

See application file for complete search history.

(56) References Cited

U.S. PATENT DOCUMENTS

2016/0029213 A1* 1/2016 Rajadurai ............ H04L 63/068
                                                                            380/283
2017/0272985 A1    9/2017 Axen et al.
2019/0313333 A1* 10/2019 Kim .................. H04W 36/0033
(Continued)

FOREIGN PATENT DOCUMENTS

CN           102448060 A          5/2012
CN           104349309 A          2/2015
(Continued)

OTHER PUBLICATIONS

Extended European Search Report for EP Application No. EP 18929165.1 dated Jun. 24, 2021 (9 pages).
(Continued)

*Primary Examiner* — Shaqueal D Wade-Wright
(74) *Attorney, Agent, or Firm* — Crowell & Moring LLP

(57) ABSTRACT

Techniques are described to generate a first security key when a user equipment operating in an inactive state initiates a data transmission or a procedure to resume network connection. The first security key is generated based on a second security key associated with a first network node and a counter value, and the first security key is associated with a second network node and is used to generate user plane security keys to transmit data to or to receive data from one or more network nodes.

17 Claims, 3 Drawing Sheets

(56) References Cited

U.S. PATENT DOCUMENTS

| | | | | |
|---|---|---|---|---|
| 2019/0327711 A1* | 10/2019 | Zhang | ................... | H04W 36/00 |
| 2020/0120499 A1* | 4/2020 | Norrman | ............... | H04W 12/50 |
| 2020/0245393 A1* | 7/2020 | Teyeb | ................... | H04W 76/25 |
| 2022/0330018 A1* | 10/2022 | Mildh | ................... | H04W 76/20 |

FOREIGN PATENT DOCUMENTS

| | | | |
|---|---|---|---|
| CN | 107277939 A | | 10/2017 |
| CN | 107708113 A | | 2/2018 |
| CN | 108029015 A | | 5/2018 |
| WO | WO 2011/137824 A1 | | 11/2011 |
| WO | WO 2017/048170 A1 | | 3/2017 |

OTHER PUBLICATIONS

"3$^{rd}$ Generation Partnership Project; Technical Specification Group Services and System Aspects; Architecture Enhancements for Cellular Internet of Things (Release 13)," 3GPP Standard TR 23.720, vol. SA WG2, No. V1.2.0, Nov. 23, 2015 (XP051046270) (pp. 1-96).

Chinese Office Action for China Application No. 201880096291.5 dated Sep. 26, 2021 (English and Chinese languages), (18 pages).

3GPP TSG-RAN WG2 NR Ad hob 1801, "Security Procedure from RRC_Inactive state in NR," RS-1801145 (Resubmission of R2-1713445), Vancouver, Canada, Jan. 22-26, 2018 (6 pages).

International Search Report and Written Opinion received for Application No. PCT/CN2018/099588 dated Apr. 28, 2019 (English and Chinese languages), (6 pages).

Chinese Office Action for China Application No. 201880096291.5 dated Mar. 18, 2022 (English and Chinese languages), (20 pages).

3GPP TSG-RAN WG2 NR Ad hoc 1801, Samsung "Security Procedure from RRC_Inactive state in NR," RS-1801145 (Resubmission of R2-1713445), Vancouver, Canada, Jan. 22-26, 2018 (6 pages).

Extended European Search Report for EP Application No. EP 18929165.1 dated Nov. 3, 2022 (7 pages).

"3 Generation Partnership Project; Technical Specification Group Services and System Aspects; Security architecture and procedures for 5G system (Release 15)", 3GPP Standard; Technical Specification; 3GPP TS 33.501, vol. SA WG3, No. V15.1.0, Jun. 21, 2018 (Jun. 21, 2018), pp. 1-152, XP051473075 (152 pp.—due to size broken into three parts for this IDS).

Office Action for Japanese Application No. 2021-506725 dated Aug. 16, 2022 (with English translation) (7 pp.).

Ericsson, RRC handling of SN Counter for NE-DC[online],3GPP TSG-RAN WG2#AH1807 R2-1810284, Internet<URL:http://www.3gpp.org/ftp/tsg_ran/WG2_RL2/TSGR2_AHs/2018_07_NR/Docs/R2-1810284.zip>, Jun. 21, 2018 (9 pp.).

Samsung,Common Security framework for Resume and Reestablishment[online], 3GPP TSG-RAN WG2#101 R2-1803430,Internet<URL:http://www.3gpp.org/ftp/tsg_ran/WG2_RL2/TSGR2_101/Docs/R2-1803430.zip>, Feb. 16, 2018 (7 pp.).

Ericsson,Way forward with Security in RRC Inactive[online],3GPP TSG-RAN WG2#101 R2-1802372, Internet<URL:http://www.3gpp.org/ftp/tsg_ran/WG2_RL2/TSGR2_101/Docs/R2-1802372.zip>, Feb. 15, 2018 (8 pp.).

Samsung,Security procedure from RRC_Inactive state in NR[online], 3GPP TSG-RAN WG2 NR Ad hoc 1801 R2-1801145, Internet<URL:http://www.3gpp.org/ftp/tsg_ran/WG2_RL2/TSGR2_AHs/2018_01_NR/Docs/R2-1801145.zip>, Jan. 12, 2018 (8 pp.).

\* cited by examiner

302 — Generating a first security key in response to the user equipment initiating a data transmission or a procedure to resume network connection while the user equipment operates in an inactive state

FIG. 3

402 — Generating, by a first network node, a first security key associated with a second network node

FIG. 4

SECURITY KEY GENERATION TECHNIQUES

RELATED APPLICATION

This application is a continuation application of PCT Patent Application No. PCT/CN2018/099588 filed Aug. 9, 2018 entitled "SECURITY KEY GENERATION TECHNIQUES," which is incorporated herein by reference in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for generating a security key when a user equipment (UE) in a Radio Resource Control (RRC) inactive state transmits data during connection reestablishment.

An exemplary embodiment discloses a wireless communication method that includes generating, by a user equipment, a first security key in response to the user equipment initiating a data transmission or a procedure to resume network connection while the user equipment operates in an inactive state. The first security key is generated based on a second security key associated with a first network node and a counter value, and the first security key is associated with a second network node and is used to generate user plane security keys to communicate data with one or more network nodes.

In some embodiments, the second security key is obtained by the user equipment based on a second counter value and a third security key, the user equipment is configured to use the third security key associated with the first network node before the user equipment transitions to the inactive state, and the second counter value is indicated by the first network node in response to the user equipment transitioning to the inactive state.

In some embodiments, the second counter value is a Next Hop Chaining Counter (NCC) value. In some embodiments, the counter value is a pre-set value, a first value included in a cell system information, or a second value included in a control message received by the user equipment.

In some embodiments, the control message is a Radio Resource Control (RRC) message used to transition the user equipment into the inactive state. In some embodiments, the data is mapped on a data radio bearer that is terminated in the second network node. In some embodiments, the one or more network nodes includes a master node or a secondary node, the first network node includes the master node, and the second network node includes the secondary node. In some embodiments, the inactive state is a Radio Resource Control (RRC) inactive state.

Another exemplary embodiment discloses a second wireless communication method. The second wireless method includes generating, by a first network node, a first security key associated with a second network node. The first security key is generated based on a second security key associated with the first network node and a counter value, the first security key is used to generate user plane security keys to communicate data with a user equipment, and the first network node generates the first security key in response to the user equipment being configured to initiate a data transmission or a procedure to resume network connection while the user equipment operates in an inactive state.

In some embodiments, the second security key is obtained by the first network node based on a second counter value and a third security key, the user equipment is configured to use the third security key associated with the first network node before the user equipment transitions to an inactive state, and the second counter value is indicated by the first network node in response to the user equipment transitioning to the inactive state.

In some embodiments, the second counter value is a Next Hop Chaining Counter (NCC) value. In some embodiments, the counter value is a pre-set value, a first value included in a cell system information, or a second value included in a control message sent to the user equipment. In some embodiments, the control message is a Radio Resource Control (RRC) message used to transition the user equipment into the inactive state.

In some embodiments, the data is mapped on a data radio bearer that is terminated in the second network node. In some embodiments, the first network node includes a master node, and the second network node includes a secondary node. In some embodiments, the first network node indicates the first security key to the second network node. In some embodiments, the inactive state is a Radio Resource Control (RRC) inactive state.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 3 shows an exemplary flowchart for generating a security key by a user equipment.

FIG. 4 shows an exemplary flowchart for generating a security key a network node.

DETAILED DESCRIPTION

In the 3rd Generation Partnership Project (3GPP) system, a new Radio Resource Control (RRC) state is introduced. The new RRC state is referred to as RRC inactive state (RRC_INACTIVE). For the user equipment (UE) in this inactive state the context information of the Access Stratum (AS) of the UE are maintained on the network side network element and the UE. Here, the AS context information includes a security context, Signaling Radio Bearer (SRB) and Data Radio Bearer (DRB) configuration information, status information, and user plane protocol layer configuration information such as Packet Data Convergence Protocol (PDCP) and Radio Link Control (RLC) configurations. The inactive UE behaves like the UE of the RRC Idle State (RRC_IDLE), that is, there is no dedicated radio resources configured for this UE. The network side network element maintains the control plane and user plane connection to core network (CN) for the inactive UE. The access network element that maintains the AS context of the UE is referred to as the anchor network element of the UE.

The UE may resume the RRC connection from the RRC inactive state through the RRC connection resume procedure, thereby returning to the RRC connected state. Specifically, the UE sends an RRC connection resume request message through the msg3 in the Random Access Channel (RACH) procedure, and carries the identifier of the UE, the verification information, and the like.

In 3GPP technology, there is a function of transmitting uplink data by a UE in a RRC inactive state, which can be implemented in an RRC inactive state by using a four-step random access procedure (RACH) or a two-step random access procedure to send uplink data.

Figure 1:
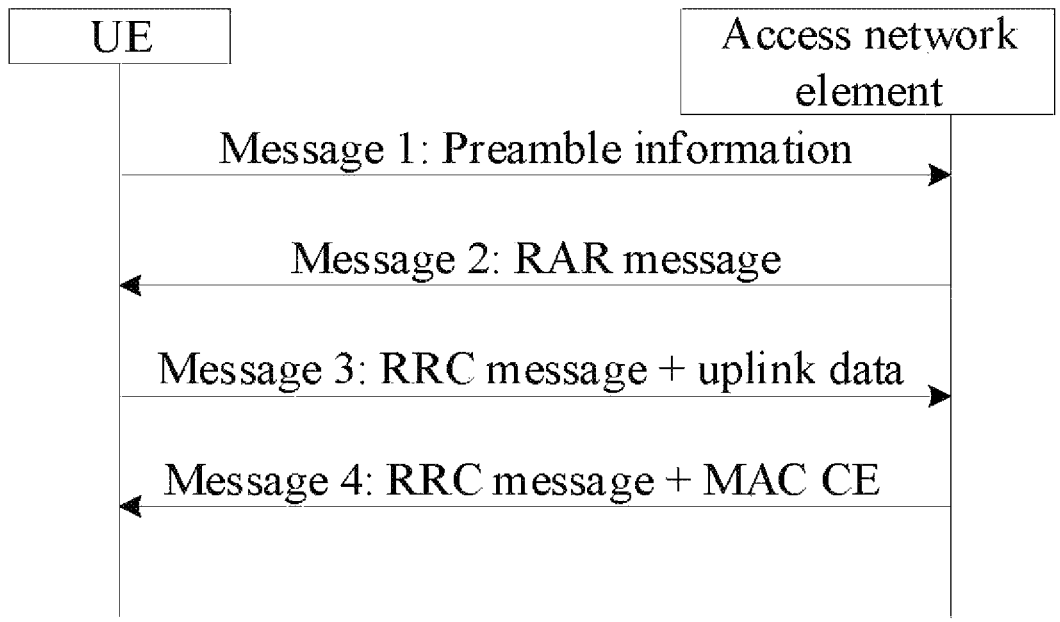
FIG. 1 is a schematic diagram of a four-step random access procedure to transmit uplink data by a UE in a RRC inactive state.

FIG. 1 is a schematic diagram of a four-step random access procedure to transmit uplink data by a UE in a RRC inactive state. As shown in FIG. 1, a UE first sends a message 1 to a network element of an access network, where message 1 includes preamble information. The access network element receives the message 1, and in response, sends a message 2 to the UE, where message 2 includes a random access response (RAR) message. After receiving the message 2, the UE sends message 3 to the access network element. Message 3 may include a RRC message (e.g., RRC connection resume request message) and uplink data. After the reception of message 3, the access network element sends message 4 to the UE, where message 4 includes a response message. As shown in FIG. 1, the response message may include a RRC message, such as a RRC connection resume message, and a medium access control (MAC) control element (CE) for contention resolution.

Figure 2:
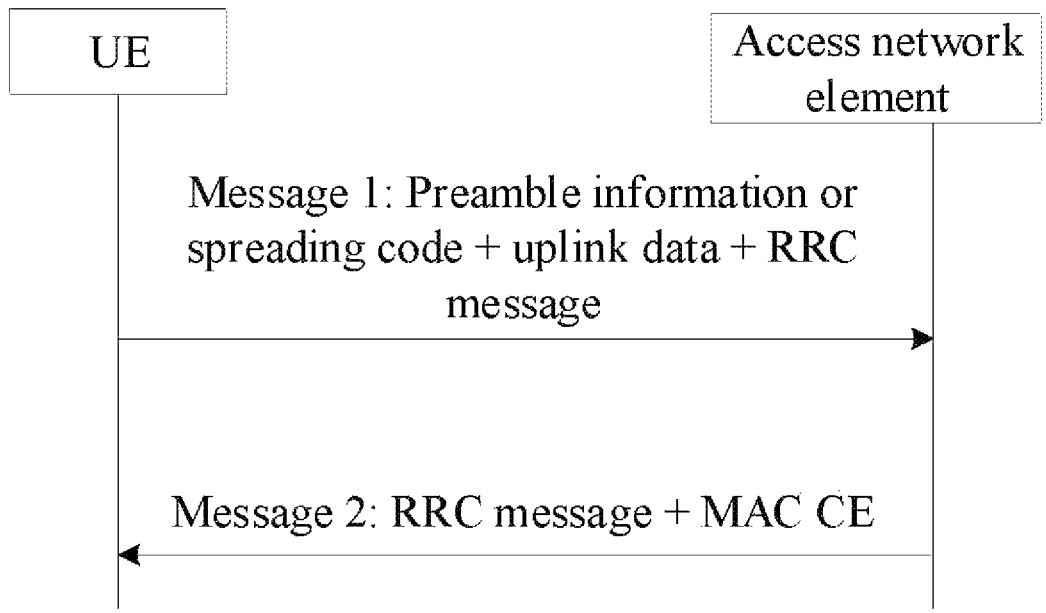
FIG. 2 is a schematic diagram of a two-step random access procedure to transmit uplink data by a UE in a RRC inactive state.

FIG. 2 is a schematic diagram of a two-step random access procedure to transmit uplink data by a UE in a RRC inactive state. As shown in FIG. 2, the UE first sends a message 1 to the access network element, where message 1 includes a preamble or spreading code. Message 1 also includes uplink data and the RRC connection resume request message. After receiving message 1, the access network element sends message 2 to the UE. Message 2 includes a response message that includes the RRC message, such as a RRC connection resume message, and a MAC CE for contention resolution.

3GPP radio access network technology also includes a dual connection (DC) mode. In DC mode, the UE establishes radio connections with two network elements at the same time. One network element is called the UE's master node (MN) and the other network element is called secondary node (SN). The UE and MN establish signaling wireless bearer SRB0, SRB1, as well as optional SRB2.

The data radio bearer type includes: MN terminated MCG bearer, MN terminated SCG bearer, MN terminated split bearer, SN terminated MCG bearer, SN terminated SCG bearer, SN terminated split bearer. MN terminated MCG bearer, MN terminated SCG bearer and MN terminated split bearer are data radio bearers which are terminated in MN. SN terminated MCG bearer, SN terminated SCG bearer and SN terminated split bearer are data radio bearers which are terminated in SN.

The SN terminated MCG bearer is a radio bearer in which the PDCP entity of the data radio bearer is established in the SN network element, the RLC and the MAC protocol entity are established in the MN network element. The SN terminated split bearer refers to the PDCP entity of the data radio bearer established in the SN network element, the RLC and MAC protocol entities is established in the two network elements of the MN and the SN, respectively.

In 3GPP, for the data radio bearer whose PDCP entity is established in MN, its user plane security keys, including user plane encryption key (KUP-ENC) and user plane integrity protection key (KRRC-INT), are derived from MN's AS layer security key (K-mn). For the data radio bearer whose PDCP entity is established in SN, its user plane security keys are derived from SN's security key K-sn. The K-sn is derived from K-mn and a counter called sk-counter, where K-sn=KDF (k-mn, sk-counter), where KDF is a security key derivation algorithm function.

In 3GPP, when the network side network element transitions the UE in the RRC connected state to the RRC inactive state through a RRC message, a Next Hop Chaining Counter (NCC) value is indicated in the RRC message, and the NCC value is used by the UE to generate a new K-mn when an RRC connection resume request message is initiated or the UE initiate uplink data transmission in RRC inactive state.

Depending on the type of MN and SN network element, the K-mn and K-sn have different names, including: (i) when the MN is an eNB defined by 3GPP or an next generation evolved NodeB (ng-eNB), K-mn is a KeNB or a Kng-eNB; (ii) when MN is a 3GPP-defined gNB, K-mn is KgNB; and (iii) when the SN is an eNB defined by 3GPP or an ng-eNB, K-sn is an S-KeNB or an S-Kng-eNB. The K-sn is S-KgNB when the SN is defined as a gNB of 3GPP.

A UE in RRC inactive state which is configured with dual connectivity in RRC connected state, may generate data mapped on SN terminated MCG bearer, SN terminated SCG bearer or SN terminated split bearer, and may initiate RRC connection resume procedure to resume RRC connection to network. Current technology does not describe how the security key is generated for these bearers when the bearer's data is generated and to be transmitted in RRC inactive state, and when UE is resumed to RRC connected state.

In an exemplary embodiment, a UE generates a K-sn in the following exemplary manner when a UE initiates a procedure to resume connection to a network node (e.g., by sending a RRC connection resume request message to a master node), or when the user equipment initiates uplink data transmission in RRC inactive state:

In some embodiments, the UE generates a new K-sn using the newly generated K-mn and the sk-counter value. The UE generates the new K-sn when the UE is in the RRC inactive state.

The newly generated k-mn is derived by the UE based on an old K-mn used before entering the RRC inactive state, and the NCC value indicated by the network side network element (e.g., a master node) when transitioning the UE from the RRC connected state to the RRC inactive state. Specifically, when the UE moves to the RRC inactive state, the AS layer context of the connected state is saved locally, where the AS context stores security key K-mn-0 used before transition to RRC inactive state, and the NCC-0 value corresponding to the security key K-mn-0.

If the value of NCC-0 saved by the UE is the same as the above-mentioned NCC value indicated by the network side network element, then the UE derives a new K-mn from the above K-mn-0 using a horizontal derivation method. If the value of NCC-0 saved by the UE is different from the above-mentioned NCC value indicated by the network side network element, then the UE derives a new K-mn from the NCC and its corresponding Next Hop (NH) value pair by using a vertical derivation method.

The sk-counter is determined by the UE using one of the following example methods:

Example Mode 1: The sk-counter value is a pre-set value of the protocol agreement, preferably, the number is 0. For example, the protocol agreement may include a value pre-determined between a UE and a network node.

Example Mode 2: The sk-counter value is a value broadcast by a cell system information. Optionally, in this method, the UE includes the sk-counter value in the msg 1 or the msg 3 in the RACH process (as shown in FIG. 1 or 2), and sends the sk-counter value to the network side network element.

Example Mode 3: The sk-counter value is the sk-counter value indicated in the dedicated RRC message sent to the UE. In this method, the network-side network element indicates the value of the sk-counter in a RRC message that transitions the UE to RRC inactive state. The UE in the RRC inactive state holds the sk-counter value in the local AS context.

After determining the sk-counter by one of the above example methods, the UE generates a new K-sn according to the newly derived K-mn and the sk-counter value.

When the UE sends uplink data in an inactive state, if the uplink data is mapped to radio data bearer which type is SN terminated MCG bearer, or SN terminated SCG bearer, or SN terminated split bearer, then the UE uses the new user plane encryption key which is derived from the new K-sn for encryption of the data to be transmitted to one or more network node (e.g., to SN via MN, to SN, or to both MN and SN). Further, if the data is to be treated with integrity protection, the UE uses the new user plane integrity protection key which is derived from the new K-sn for this data integrity protection process. The user plane encryption security key and user plane integrity protection security key derived from K-sn are also used by UE to process downlink data of SN terminated MCG bearer, SN terminated SCG bearer and SN terminated split bearer.

When the UE sends uplink data in an inactive state, if the uplink data is mapped to a data radio bearer which type is MN terminated MCG bearer, or MN terminated SCG bearer, or MN terminated split-bearer, the UE uses the new user plane encryption keys which is derived from the new K-mn for encryption of this data to be transmitted to one or more network node (e.g., to MN, to MN via SN, or to both MN and SN). Further, if the data is to be treated with integrity protection, the UE uses the new user plane integrity protection security key new which is derived from the new K-mn for the data integrity protection process. The user plane encryption security key and user plane integrity protection security key derived from K-mn are also used by UE to process downlink data of MN terminated MCG bearer, MN terminated SCG bearer and MN terminated split bearer.

Specifically, when the UE sends uplink data in an inactive state, or when UE initiate RRC connection resume request, the UE re-establish the PDCP entity of the data radio bearer, that is, PDCP re-establishment, and applies the newly generated user plane encryption security key for data radio bearer and, if necessary, the integrity protection security key.

The network side network element that receives the data transmitted by the UE in an RRC inactive state through msg1 or msg3 (as shown in FIG. 1 or 2) or the RRC connection resume request message determines the sk-counter for generating the new K-sn in a similar manner as the manner in which the UE determines the sk-counter. In some embodiments, sk-counter is determined by the network side network element using one of the following example methods:

Example Mode 1: The sk-counter value is a value of the protocol agreement, preferably, the number is 0.

Example Mode 2: The sk-counter value is a value broadcast by the cell system information. The access network element determines the value of the sk-counter by obtaining the sk-counter value carried in the msg1 or the msg3 sent by the UE (as shown in FIG. 1 or 2).

Example Mode 3: The sk-counter value is the sk-counter value indicated in the dedicated RRC message sent to the UE. In this method, the network side network element obtains the sk-counter value from the UE AS context saved in the network-side.

The network-side network element derives a new k-mn using a similar method as UE, which derives a new k-mn from the k-mn-0 of the UE prior to entering the RRC inactive state and the NCC value indicated when the UE is converted to the RRC inactive state.

Specifically, and for example:

(i) The network-side network element derives a new K-sn based on the new k-mn and the sk-counter value as described above. For example, a master node generates a new security key K-sn based on a newly generated security key K-mn. The master node generates the new K-sn in response to the user equipment being configured to initiate a data transmission or a procedure to resume connection with a network node while the user equipment operates in an inactive state.

(ii) The current network side network element MN indicates the newly derived K-sn to the new network side network element SN. Specifically, the new MN indicates the new SN with the new K-sn in the message of adding the SN, that is, the newly derived K-sn is included in the SN addition request message sent to the SN; or (iii) The new MN includes a new K-sn in the message indicating the UE's old SN to resume the UE's data radio bearer resources.

The SN that received the above message processes the message as follows:

The SN derives an user plane encryption key from the K-sn and, if necessary, the SN derives an integrity protection key for the data radio bearer whose PDCP entity is located on the SN.

For the data radio bearer whose PDCP entity is located on the SN, the SN re-establishes its PDCP entity (PDCP re-establishment), applies a newly derived user plane encryption key to the PDCP entity, and applies an integrity protection key to the PDCP, if necessary.

FIG. 3 shows an exemplary flowchart for a user equipment. At the generating operation 302, the user equipment generates a first security key when the user equipment initiates a data transmission or a procedure to resume network connection while the user equipment operates in an inactive state. The first security key is generated based on a second security key associated with a first network node and a counter value. Further, the first security key is associated with a second network node and is used to generate user plane security keys to communicate data with one or more network nodes.

In some embodiments, the second security key is obtained by the user equipment based on a second counter value and a third security key, where the user equipment is configured to use the third security key associated with the first network node before the user equipment transitions to the inactive state, and where the second counter value is indicated by the first network node in response to the user equipment transitioning to the inactive state.

In some embodiments, the second counter value is a Next Hop Chaining Counter (NCC) value. In some embodiments, the counter value is a pre-set value, a first value included in a cell system information, or a second value included in a control message received by the user equipment. In some embodiments, the control message is a Radio Resource Control (RRC) message used to transition the user equipment into the inactive state.

In an exemplary embodiment, the data is mapped on a data radio bearer that is terminated in the second network node. In some embodiments, the one or more network nodes includes a master node or a secondary node, the first network node includes the master node, and the second network node includes the secondary node. In an exemplary embodiment, the inactive state is a Radio Resource Control (RRC) inactive state.

FIG. 4 shows an exemplary flowchart for a network node. At the generating operation 402, a first network node generates a first security key associated with a second network node. In some embodiments, the first security key is generated based on a second security key associated with the first network node and a counter value, the first security key is used to generate user plane security keys to communicate data with a user equipment, and the first network node generates the first security key in response to the user equipment being configured to initiate a data transmission or a procedure to resume network connection while the user equipment operates in an inactive state.

In an exemplary embodiment, the second security key is obtained by the first network node based on a second counter value and a third security key, where the user equipment is configured to use the third security key associated with the first network node before the user equipment transitions to an inactive state, and where the second counter value is indicated by the first network node in response to the user equipment transitioning to the inactive state.

In some embodiments, the second counter value is a Next Hop Chaining Counter (NCC) value. In some embodiments, the counter value is a pre-set value, a first value included in a cell system information, or a second value included in a control message sent to the user equipment. In some embodiments, the control message is a Radio Resource Control (RRC) message used to transition the user equipment into the inactive state.

In some embodiments, the data is mapped on a data radio bearer that is terminated in the second network node. In some embodiments, the first network node includes a master node, and the second network node includes a secondary node. In some embodiments, the first network node indicates the first security key to the second network node. In an exemplary embodiment, the inactive state is a Radio Resource Control (RRC) inactive state.

Figure 5:
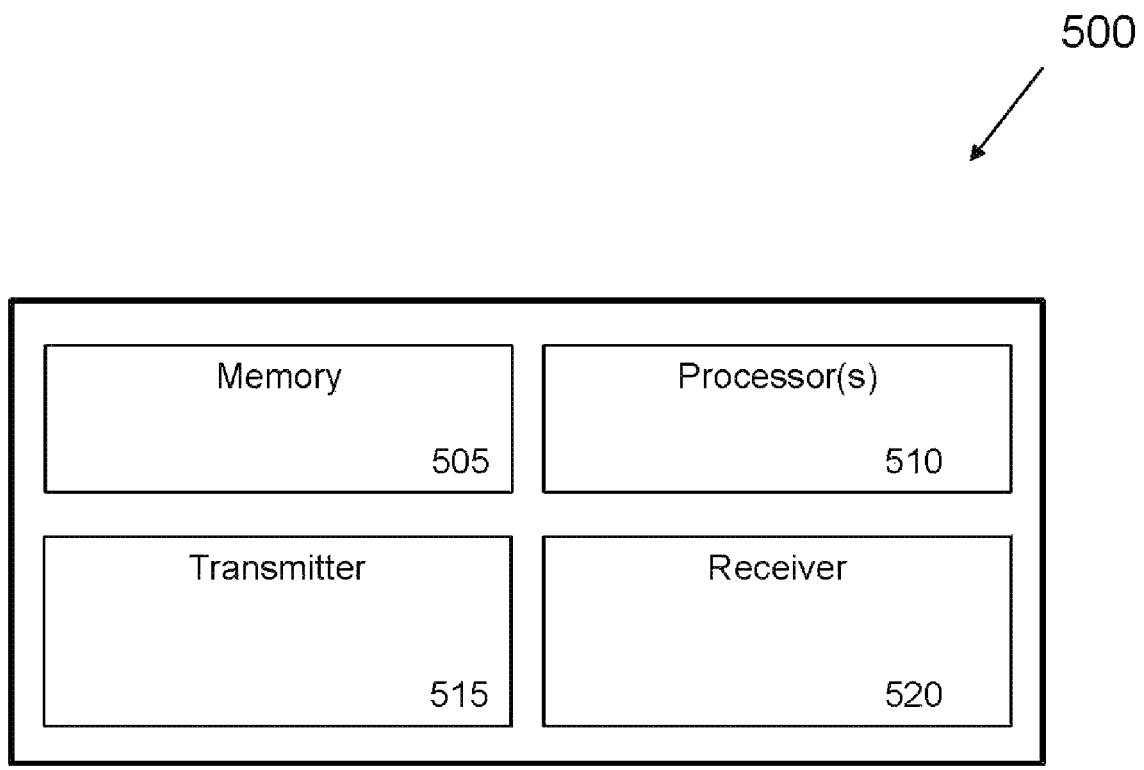
FIG. 5 shows an exemplary block diagram of a hardware platform 500 that may be a part of a network node or a user equipment.

FIG. 5 shows an exemplary block diagram of a hardware platform 500 that may be a part of a network node or a user equipment. The hardware platform 500 includes at least one processor 510 and a memory 505 having instructions stored thereupon. The instructions upon execution by the processor 510 configure the hardware platform 500 to perform the operations described in FIGS. 1 to 4 and in the various embodiments described in this patent document. The transmitter 515 transmits or sends information or data to another node. For example, a network node transmitter can send a message to a user equipment. The receiver 520 receives information or data transmitted or sent by another node. For example, a user equipment can receive a message from a network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

We claim:

1. A wireless communication method, comprising:
generating, by a user equipment, a first security key in response to the user equipment initiating a data transmission or a procedure to resume network connection while the user equipment operates in an inactive state,
wherein the first security key is generated based on a second security key associated with a first network node and a counter value,
wherein the second security key is obtained by the user equipment based on a second counter value and a third security key different from the first security key, and
wherein the first security key is associated with a second network node and is used to generate user plane security keys to communicate data mapped on a data radio bearer that is terminated in the second network node with one or more network nodes.

2. The method of claim 1,
wherein the user equipment is configured to use the third security key associated with the first network node before the user equipment transitions to the inactive state, and
wherein the second counter value is indicated by the first network node in response to the user equipment transitioning to the inactive state.

3. The method of claim 2, wherein the second counter value is a Next Hop Chaining Counter (NCC) value.

4. The method of claim 1, wherein the counter value is a pre-set value, a first value included in a cell system information, or a second value included in a control message received by the user equipment.

5. The method of claim 4, wherein the control message is a Radio Resource Control (RRC) message used to transition the user equipment into the inactive state.

6. The method of claim 1, wherein the one or more network nodes includes a master node or a secondary node, the first network node includes the master node, and the second network node includes the secondary node.

7. The method of claim 1, wherein the inactive state is a Radio Resource Control (RRC) inactive state.

8. A wireless communication method, comprising:
generating, by a first network node, a first security key associated with a second network node, wherein the first security key is generated based on a second security key associated with the first network node and a counter value, further wherein the first security key is used to generate user plane security keys to communicate data with a user equipment,
wherein the second security key is obtained by the first network node based on a second counter value and a third security key different from the first security key, and
wherein the first network node generates the first security key in response to the user equipment being configured to initiate a data transmission or a procedure to resume network connection while the user equipment operates in an inactive state, wherein the data is mapped on a data radio bearer that is terminated in the second network node.

9. The method of claim 8,
wherein the user equipment is configured to use the third security key associated with the first network node before the user equipment transitions to an inactive state, and
wherein the second counter value is indicated by the first network node in response to the user equipment transitioning to the inactive state.

10. The method of claim 9, wherein the second counter value is a Next Hop Chaining Counter (NCC) value.

11. The method of claim 8, wherein the counter value is a pre-set value, a first value included in a cell system information, or a second value included in a control message sent to the user equipment.

12. The method of claim 11, wherein the control message is a Radio Resource Control (RRC) message used to transition the user equipment into the inactive state.

13. The method of claim 8, wherein the first network node includes a master node, and the second network node includes a secondary node.

14. The method of claim 8, wherein the first network node indicates the first security key to the second network node.

15. The method of claim 8, wherein the inactive state is a Radio Resource Control (RRC) inactive state.

16. An apparatus for wireless communication comprising a processor, configured to implement a method recited in claim 1.

17. A non-transitory computer readable program storage medium having code stored thereon, the code, when executed by a processor, causing the processor to implement a method recited in claim 1.

* * * * *